United States Patent [19]

Watanabe

[11] 4,373,199
[45] Feb. 8, 1983

[54] APPARATUS FOR ELECTROMAGNETICALLY IMPARTING STYLUS FORCE FOR SOUND REPRODUCING DEVICE COMPRISING AN INHIBIT CIRCUIT FOR SHOCK NOISE OF REPRODUCING STYLUS

[75] Inventor: Katsumi Watanabe, Kawasaki, Japan
[73] Assignee: Ozen Corporation, Tokyo, Japan
[21] Appl. No.: 252,952
[22] Filed: Apr. 10, 1981

[30] Foreign Application Priority Data

Apr. 15, 1980 [JP]   Japan .................................. 55/49404
Jun. 17, 1980 [JP]   Japan .................................. 55/82003

[51] Int. Cl.³ .......................... G11B 1/00; G11B 25/04
[52] U.S. Cl. ......................................... 369/31; 369/33;
                                              369/41; 369/65; 369/67
[58] Field of Search ....................... 369/31, 65, 33, 41,
                                              369/67

[56] References Cited

U.S. PATENT DOCUMENTS 3,748,748  7/1973  Beran et al. ........................... 369/31
3,799,556  3/1974  Watanabe ............................... 369/31
4,093,832  6/1978  Isaaoson et al. ....................... 369/41
4,245,404  1/1981  Yoshinari .............................. 369/41

Primary Examiner—Steven L. Stephan
Attorney, Agent, or Firm—Basile, Weintraub & Hanlon

[57] ABSTRACT

Disclosed is an apparatus for electromagnetically imparting stylus force for sound reproducing device comprising an inhibit circuit for shock noise of the reproducing stylus. A selected one of start switches is actuated to start a motor to drive a recorded disc. A rotary contact provided on the rotating recorded disc engage a plurality of fixed contacts arranged such that there is a predetermined positional relationship between the fixed contacts and a position toward which a pickup is lowered so that the pickup may engage the reproduction start point of a specified one of recorded grooves provided circumferentially on the recorded disc, whereby an electromagnetic actuator is actuated in accordance with the timing of engagement between the rotary contact and the specified fixe contact which corresponding to the selected start switch. When the actuator is actuated, an armature of the actuator imparts stylus force upon the pickup. The actuator is held in its actuated status by a self holding transistor circuit. A piece of magnet is provided on the tone arm. When the magnet comes near a magnetically sensitive reed switch provided at the neighbourhood of the end position of reproduction of the recorded disc, the reed switch is closed to turn off the electromagnetic actuator to thereby complete one cycle of reproduction. A pickup inhibit transistor and a capacitor is connected to the connection between the electromagnetic actuator and the actuator self holding transistor circuit so that the pickup is made inoperative during a short period of time when the electromagnetic actuator is made actuated thereby inhibiting the amplification of the shock noises of the reproduction stylus.

5 Claims, 3 Drawing Figures

APPARATUS FOR ELECTROMAGNETICALLY IMPARTING STYLUS FORCE FOR SOUND REPRODUCING DEVICE COMPRISING AN INHIBIT CIRCUIT FOR SHOCK NOISE OF REPRODUCING STYLUS

BACKGROUND OF THE INVENTION

1. Field of the Invention

This invention relates to sound reproducing devices having selective reproduction circuits.

More particularly, it relates to a sound reproducing device which performs engagement of the pickup thereof with desired one of the recorded grooves by means of an electromagnetic actuator which functions also to maintain the engagement.

2. Description of the Prior Art

Sound reproducing devices, particularly simplified phonographs of the multitrack recording type are widely used as they permit reproduction of the sounds of several different items.

Apart from sound reproducing devices of the type which permit a random selection of recorded sounds, there are devices of the type which permit only an intentional selection of one of the several specific items of the recorded sounds which comprise a number of stoppers corresponding to the number of the recorded grooves and which are provided outside the casing of the device for manual operation.

A prior art reference known to the inventor of this application is Japanese Patent Publication No. 19763/76, which discloses that a fully mechanical construction can be used for the selecting mechanism.

According to the knowledge of the present inventor, the device disclosed by the above-mentioned prior art reference is being widely used as a sound reproducing device of the mechanical construction and verious number of demands have arisen for applying such devices to general machines or apparatuses in addition to dolls or toys.

However, it has been found that there are some restrictions for applying this kind of devices as they stand to such various kind of machines or apparatuses due to the mechanical relation with respect to the construction and space between that apparatuses to which such devices are applied.

That is, the arrangement disclosed in the above-mentioned prior art reference has a plurality of stoppers disposed at predetermined positions corresponding to the starting points of the respective record grooves and a projection protruding out from a marginal end face of the turn table at a fixed position with respect to the record disc.

Pushing down any one of the stoppers results in engagement of the selected stopper with the projection which gives rise to a temporary stopping of the turn table and thereby enables the starting point of the selected record groove to be positioned immediately below a reproducing stylus.

According to this construction, the stoppers project outside the casing and further the location of such stoppers cannot be changed due to the relationship to be maintained between the starting points of the sound reproduction and the projection protruding out from the marginal end of the turn table.

The fact that the position of the protrusion of the stopper is fixed and that a plurality of stoppers must project with considerable length out of the casing not only makes it difficult to incorporate the stoppers into such devices and to manipulate the stoppers through the devices, but also brings about another problem of a very complicated mechanism, high expense and mechanical troubles when the manipulation of the stoppers is required to be done from another position remote from such devices.

A simplified phonograph of this kind not only imparts necessary stylus force by means of a stylus force spring, but also the speaker to be used is limited to one which mechanically amplifies the reproduced vibrations by the pickup.

Such a simplified phonograph can only be applicable to easy and low level demands and it is very difficult to up grade the quality of the reproduced sounds to a practical level.

It is strongly desired in this respect to impart the stylus force by means of an electromagnetic actuator and to use a loudspeaker of electrical or electromagnetic type.

SUMMARY OF THE INVENTION

The present invention aims to solve such problems and satisfy the requirements as mentioned above.

An object of the present invention is to provide a sound reproducing device without utilizing mechanical stoppers and thereby to expand the field of application of such devices.

Another object of the present invention is to provide a sound reproducing device still maintaining simplified construction.

A further object of the present invention is to provide a sound reproducing device having a potential for far less malfunctions with reasonably lower costs.

More further object of the present invention is to provide a sound reproducing device which permits selective reproduction and one which is capable of ready manipulation.

Yet further object of the present invention is to provide a switch construction applicable to both a single groove record disc and to a multitrack record disc.

A still further object of the present invention is to make it possible to use an electrically operable loudspeaker by adopting an electromagnetically operated stylus force imparting means and thereby improve the quality of the reproduced sound.

A further object of the present invention is to provide a construction capable of incorporating an electrically operable selective sound reproducing device into a compact casing.

A still further object of the present invention is provide a sound reproducing device which utilizes an electrically operable pickup means but which is still capable of preventing amplification of shock noise due to a strong shock caused by impingement of the reproducing stylus on the record disc.

According to the present invention, a single or a plurality of start switches are connected via the base of a transistor in a motor driving circuit to an electric motor and similarly connected to corresponding fixed contacts of a rotary switch.

A rotary contact of the rotary switch is connected to the base of an actuator transistor and an electromagnetic actuator is connected to the collector of a transistor circuit for the actuator.

The actuator is connected to a power supply source together with the motor.

A series circuit including a magnetic load switch and a capacitor is connected to the junction between the start switch and a transistor in a motor circuit.

The connection between the start switch and the magnetic reed switch is also connected to the emitter of a transistor for self holding purposes, while the collector thereof is connected to the connection between the rotary contact of the rotary switch and the actuator transistor circuit.

The base of the self holding transistor is connected to the connection between the electromagnetic actuator and the collector of the actuator transistor circuit. The connection between the magnetic reed switch and the capacitor is connected to the base of an inhibitor transistor, the connection of which is connected to the base of the actuator transistor circuit.

A magnetically operated reed switch is disposed at the end point of sound reproduction and is held OFF during reproduction. The reed switch is turned ON when a magnet piece attached to the tone arm comes near the end point, namely, the magnetic reed switch.

The fixed contacts of the rotary switch are fixed to a circuit carrying body, such as a printed base plate, while the rotary contact is fixedly attached to the central part of the record disc and is arranged to rotate with the rotation of the record disc and to progressively contact the fixed contacts.

Most of the electrical circuits are compactly disposed on and carried by the printed base plate. Preferably, the printed base plate is positioned above the record disc, while other components, such as the electric motor, the electromagnetic actuator, the tone arm, etc., are carried by a chassis.

The record disc has one or a plurality of record grooves. The starting point of each of such record grooves is positioned to be equally spaced apart from each other.

The fixed contacts of the rotary switch are distributed on the base plate at a position along the circle of rotation of the record disc and are spaced apart from each other to satisfy a relationship with the predetermined lowering of the pickup before entering into the starting point of the selected record groove.

To the connection between the electromagnetic actuator and the transistor circuit for actuating same, a capacitor and a pickup inhibitor transistor are connected in parallel. The collector of the inhibitor transistor is connected to the connection between the pickup and an amplifier.

According to the present invention, when the start switch is pushed down, the drive motor is actuated to rotate the record disc which results in rotation of the rotary contact.

At the moment when the rotary contact engages, during its rotation, with one of the fixed contacts corresponding to the start switch being pushed down, the transistor circuit for actuating the electromagnetic actuator is turned on to energize the actuator to thereby move the tone arm toward the record disc so as to impart a desired stylus force to the record disc.

Thus, the pickup moves downward such that the reproducing stylus thereof can be engaged with a selected record groove and finally the stylus impinges on the face of the record disc and engages the desired groove.

The transistor circuit for actuating the electromagnetic actuator can be maintained "ON" by the transistor even if the self holding rotary contact has passed over and departed from the selected fixed contact until the tone arm reaches the end point of sound reproduction and approaches the magnetically operated reed switch, which is turned on by the magnet piece. This turns the inhibitor transistor ON and prevents current from flowing into the base of the actuator transistor.

The transistor circuit for energizing the actuator is therefore turned off, so that the electromagnetic actuator becomes deactuated so as to release the stylus force imparted to the pickup and the tone arm is urged by the return spring to return to the starting point of sound reproduction.

At this time, magnetically operated reed switch is turned off, while the inhibitor switch is still maintained at its on state by the capacitor so as to inhibit the electromagnetic actuator from being energized and to permit the tone arm to continue to travel on its return to the starting point of sound reproduction.

When the transistor circuit for the electromagnetic actuator is at its off state, that is, the actuator is not energized, the capacitor connected to the connection between the transistor circuit and the actuator is charged so that a current flows as a base current to the pickup inhibitor transistor thereby turning it on.

This makes the impedance at the input side of the amplifier very low so that a shock noise from the pickup due to impingement of the reproducing stylus against the record disc cannot be amplified.

The capacitor branched from the connection between the magnetic actuator and the transistor circuit discharges through the actuator transistor circuit, thereby reducing the current flowing into the base of the pickup inhibitor transistor which is therefore turned off, so that the amplifier is released from the inhibit of the operation and allowed to amplify the reproducing signal in the usual manner.

Thus, according to the present invention, a desired record groove may be exactly selected by electrical contacts and the apparatus according to the invention is suitable for sound reproduction purposes in which a desired record groove is selected among a plurality of record grooves on the record disc. The development of many fields of application of the apparatus according to the invention may be expected. The apparatus is of course applicable to the reproduction of such a record disc provided with a single record groove.

Having neither a spring for imparting stylus force nor a sound transmission member, the apparatus may be designed in the form of an electrical sound reproduction device and may be reduced in its size.

Further, the sound generated at the instance when the pick-up impinges on the surface of the record disc may be prevented from being amplified, while only the normal output signal from the pickup may be amplified with a very good performance.

DESCRIPTION OF THE PREFERRED EMBODIMENTS

Figure 1:
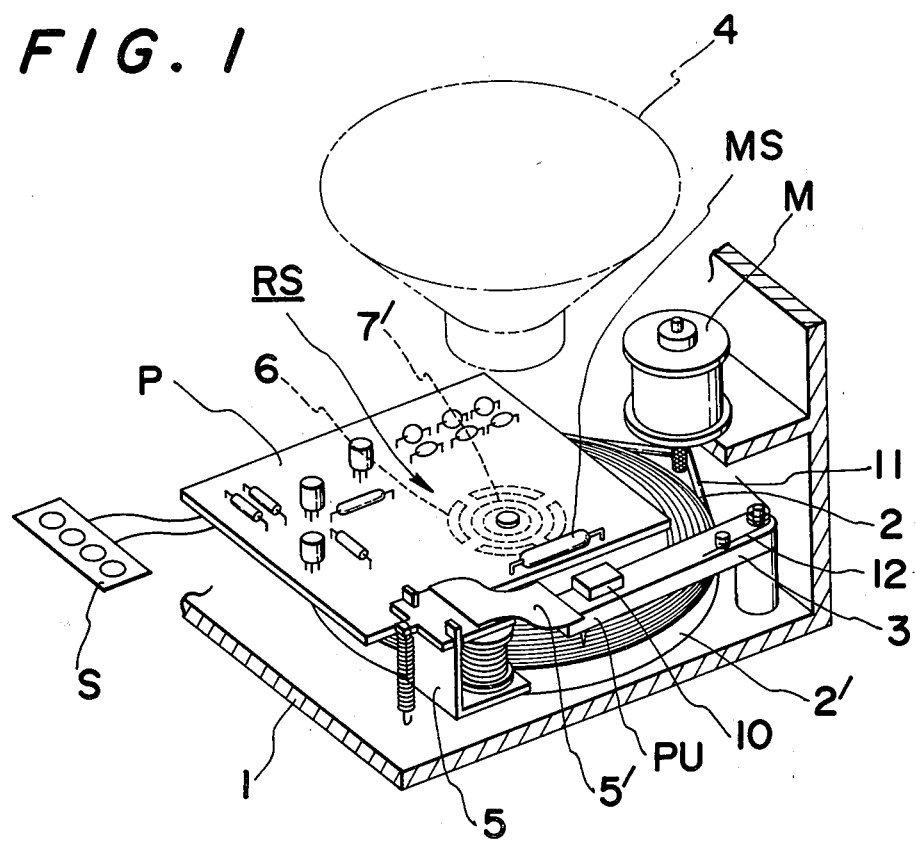
FIG. 1 is a perspective view showing the internal construction of the device of the present invention in on exposed manner.

As shown in FIG. 1, a turn table 2' is rotatably carried on a chassis 1 by a center pin.

A tone arm 3 together with its pickup PU swingably extends over the turn table 1 and is urged by a spring 12 to move upward and outward to the outer periphery of the record disc 2.

The chassis 1 also carries thereon a flapper in the form of a flapper type solenoid, an electromagnetic actuator 5, an electric motor M and a circuit board P carring circuit components connected via printed circuit conductors.

The turn table 2' is provided around its side peripheral face with a pulley groove 2'' (refer to FIG. 2) around and between which and the output shaft of the motor M a belt 11 is extended.

An armature 5' of the electromagnetic actuator 5 is arranged to extend over the record disc such that a part of the record disc 2 is covered thereunder between its starting and end points of sound reproduction respectively at the outer periphery and the central portion of the record disc 2.

The record disc 2 is integrally formed with the turn table 2' and is of such a type that recorded grooves G are formed on the upper face thereof.

Figure 2:
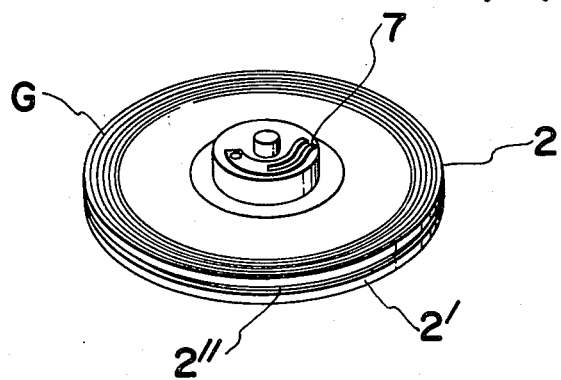
FIG. 2 is a perspective view of a turn table constituting a record disc.

A shown in FIG. 2, in this case, the record disc 2 has four recorded grooves the respective leading ends of which are positioned at the outer periphery of the record disc and are circumferentially and equidistantly spaced apart from each other.

As shown in FIG. 1, a magnet piece 10 is attached on the tone arm 3. The pickup PU of the tone arm is of an electrical cartridge type and is connected to an electrical sound speaker 4 via an amplifier mentioned later.

The circuit board or printed base plate P is arranged to swingably extend over the record disc 2 and carries the necessary electronic circuit components connected via printed circuit conductors.

A magnetic sensitive reed switch MS is arranged to extend over the end point of sound reproduction of each of the record grooves G of the record disc selected for playing.

The circularly arranged fixed contacts 6 and a slip ring contact 7' constitute a rotary switch RS, and the center of the contacts 6 and the center of contact 7' coincide with the center of the record disc 2.

As shown in FIG. 2, a rotary contact blade 7 having a bifurcated tip portion is attached to the central portion of the record disc 2 such that it contacts the slip ring contact 7' and progressively contacts one of the fixed contacts disposed on the lower surface of the circuit board P.

The rotary switch comprises four fixed contacts 6 corresponding to the number of recorded grooves G on the record disc 2.

The fixed contacts 6 are distributed circularly along the rotational direction of the record disc 2 and spaced apart from each other in such a manner that each of them electrically corresponds to a respective point predetermined for the pickup to be lowered before entering into the starting point of the selected record groove.

Figure 3:
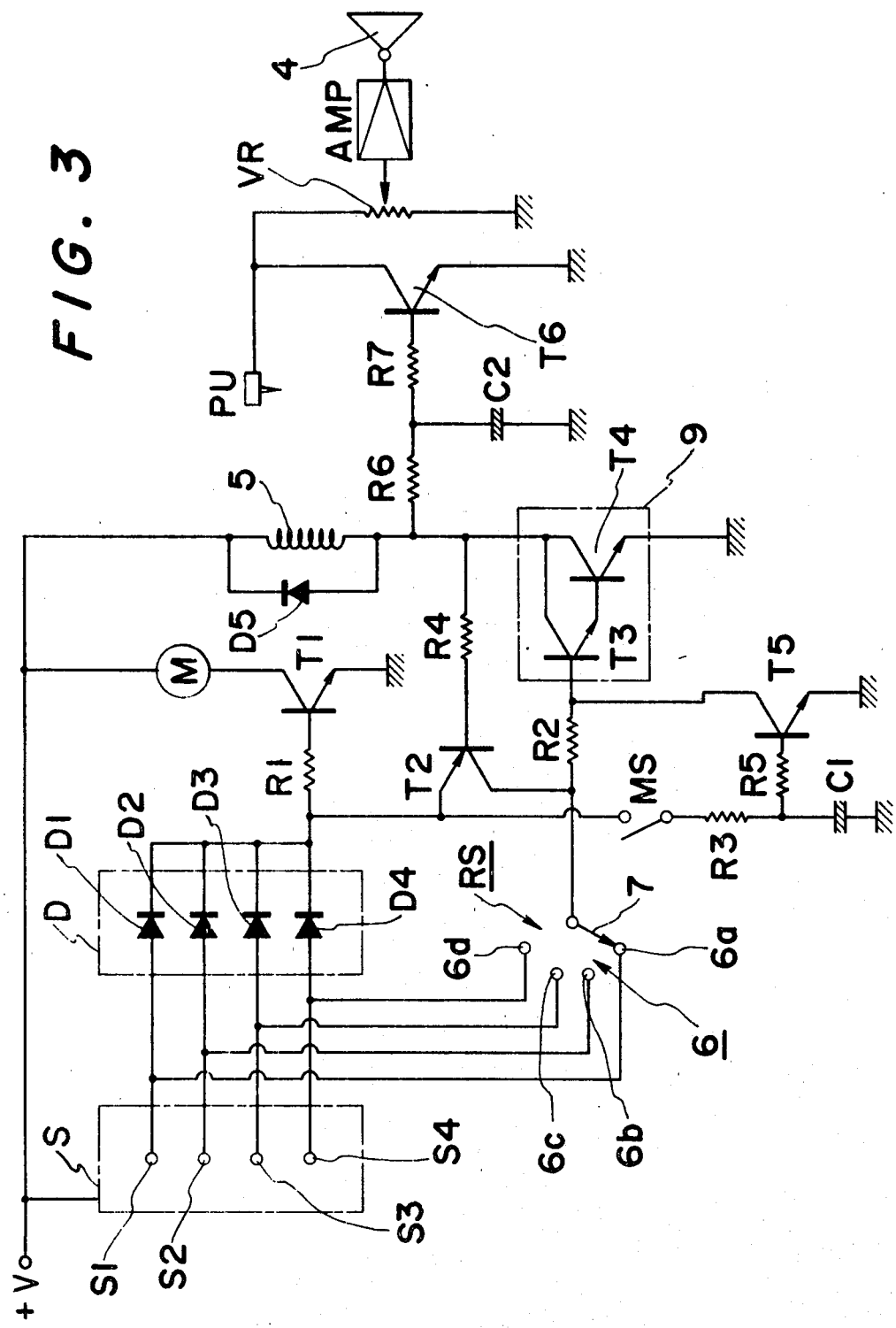
FIG. 3 is a schematic diagram of the circuit employed in the device of the present invention.

The electronic circuit comprises a start switch S, FIG. 3, comprising switch units corresponding to the number of the fixed contacts, which switch S is fixed at a desired portion on the outer surface of the chassis so as to be functionally suitable for manipulation.

Similarly, a speaker 4 can be fixed on the chassis at a desired portion outside thereof. An electronic circuit for operation these devices is shown in FIG. 3.

The start switch S comprises four switch units S1-S4 corresponding to the number of the aforesaid fixed contacts. The respective terminals of the four start switch units S1-S4 are connected to the base of a transistor T1 via respective diodes D1-D4 which constitute a diode unit D and a common resistor R1.

The collector of the transistor T1 is connected to the positive pole of the power supply source through a motor M.

The respective connections between the start switch units S1, S2, S3, S4 and the corresponding diodes D1-D4 are respectively connected to the fixed contacts 6a-6d of the rotary switch RS.

The rotary contact 7 of the rotary switch RS is connected via a resistor R2 to the base of a transistor T3 in an actuator circuit 9 which is composed of two transistors T3 and T4 connected in a Darlington configuration.

The collectors of the transistors T3 and T4 are commonly connected to the positive pole of the power supply source via the electromagnetic actuator 5. The electromagnetic actuator 5 is connected in parallel with a diode D5 in order to prevent counter electromotive force from being induced.

The connection between the diode unit D and the resistor R1 is grounded via the magnetic lead switch MS, a resistor R3 and a capacitor C1 in this order.

The connection or junction between the electromagnetic actuator 5 and the actuator circuit 9 is connected via resistor R4 to the base of a self holding transistor T2.

The emitter of the self holding transistor T2 is connected to the connection between the diode unit D and the magnetic reed switch MS, while the collector of the transistor T2 is connected to the connection between the rotary contact 7 and the resistor R2.

The connection between the actuator transistor circuit 9 and the electromagnetic actuator 5 is connected to the base of a pickup inhibitor transistor T6 via a resistor R6 and a resistor R7 arranged in series.

The connection between the aforesaid resistors R6 and R7 is grounded via the capacitor C2.

The pickup PU is connected via potentiometer VR to an amplifier AMP which is in turn connected to the speaker 4.

The collector of the pickup inhibitor transistor T6 is connected to the connection between the pickup PU and the potentiometer VR while the emitter thereof is grounded.

Assume now that the first start switch S1 of the start switch S is pushed for selecting the first record groove, then the transistor T1 is turned on so that the motor starts for rotation, while the current flowing from the start switch S1 to the base of the transistor T1 is prevented by a series of diodes D2-D4 from entering into the connections between these diodes D2-D4 and other start switches S2-S4.

Rotation of the record disc accompanies rotation of the rotary contact 7 which will progressively contact with respective fixed contacts 6a-6d and at the moment when the rotary contact 7 engages the fixed contact 6a corresponding to the start switch S1 the transistor circuit 9 is turned on and energizes the electromagnetic actuator 5 to move the armature 5' in FIG. 1 downward to lower the tone arm 3 such that the reproducing stylus engages the record disc 2.

As already explained, each of the fixed contacts 6a–6d is distributed at a position along the circle of rotation of the record disc 2 and are spaced apart from each other in such a manner that each electrically corresponds to the respective point predetermined for the pickup to be lowered before entering into the starting point of the selected record groove.

Accordingly, by pushing the start switch S2 the rotary contact 7 begins to rotate, and upon contact of the rotary contact 7 with the fixed contact 6a the electromagnetic actuator 5 is energized to lower the pickup, which gives the rise to the reproducing stylus entering a specific record groove G without fail.

Even if the rotary contact 7 has passed over the fixed point 6a, since the self holding transistor T2 had become conductive due to the manipulation of the start switch S1 and subsequent contact of the rotary contact 7 with the fixed contact 6a of the rotary switch RS to thereby maintain the actuator transistor circuit 9 closed, the electromagnetic actuator 5 is still maintained in and energized state.

At the time where the electromagnetic actuator 5 is not yet energized, since the actuator transistor circuit 9 is OFF, the capacitor C2 is charged by a current flowing through the resistor R6 and the pickup inhibitor transistor T6 is maintained fully conductive by the base current applied through the same resistor R6.

As the impedance at the input side of the amplifier AMP is very low, a signal generated by the pickup PU, if any, can not be amplified.

This means, when the actuator transistor circuit 9 is ON, the electromagnetic actuator 5 is energized and the pickup inhibitor transistor T6 is ON, that any noise of shock caused by the impingement of the pickup PU against the record groove G is not amplified.

However, when the actuator transistor circuit 9 has once become ON, the electric charge on the capacitor C2 is rapidly discharged through the resistors R6 and R7, so that no more current is supplied to the base of the pickup inhibitor transistor T6 thereby turning the transistor T6 OFF.

Now, the impedance at the input side of the amplifier AMP becomes sufficiently high to amplify the electric signal from the pickup PU, namely, the reproduced signal of the recorded sounds.

In this manner, sound reproduction goes on until the pickup PU reaches the end point of sound reproduction, where the magnet 10 carried by the tone arm 3 turns the magnetic reed switch MS ON which in turn turns the self holding transistor T2 as well as the electromagnetic actuator 5 OFF.

Accordingly, the tone arm 3 is released and returns to the starting point of sound reproduction being urged by the resilient force of the return spring 12, and at the same time, the magnetic sensitive reed switch MS turns OFF thereby turning the self holding transistor T2 ON.

Under this condition, the charge on capacitor C1 makes the inhibitor transistor T5 conductive and maintains the actuator transistor circuit 9 OFF.

In this way, one cycle of sound reproduction is completed.

In the embodiment explained above, since the start switch itself has no self holding performance, it must be manually held during a cycle of reproduction, but it is apparent that other various types of self holding devices such as a timer can be used in combination.

I claim:

1. An apparatus for electromagnetically imparting stylus force for a sound reproducing device having a recorded disc rotatably supported on a chassis, an electric motor for driving said disc, a tone arm biased both in the direction away from said disc and in the direction toward a starting position of reproduction, said apparatus comprising:

electromagnetic actuator means having an armature for urging said tone arm toward the recorded surface of said disc when said actuator is energized;

rotary switch means disposed between said chassis and said recorded disc and including a rotary contact and a plurality of fixed contacts, said rotary switch means being arranged such that said rotary contact rotates with the rotation of said recorded disc so as to be in contact sequencially with said fixed contacts, said fixed contacts and a position toward which a pickup of said tone arm is lowered being arranged in a predetermined positional relationship so that said pickup may engage the reproduction start point of a specified one of recorded grooves provided circumferentially on said recorded disc;

an electric power source;

a motor circuit connected across said power source and including a motor and a first transistor connected in series with said motor;

an actuator transistor circuit means connected in series with said electromagnetic actuator means, the series connection between said actuator transistor circuit means and said electromagnetic actuator means being connected across said power source; a series circuit consisting of start switching means, a normally open magnetic sensitive read switch and a capacitor, said series circuit being connected across said power source;

a base of said first transistor being connected to said power source through said start switching means;

a base of said actuator transistor circuit means being connected to said rotary contact of said rotary switch means;

a second transistor arranged for self holding, a base of said second transistor being connected to the connection between said electromagnetic actuator means and a collector of said actuator transistor circuit means, an emitter of said second transistor being connected to said series circuit, a collector of said second transistor being connected to the connection between said rotary contact and said actuator transistor circuit means;

magnet means provided on said tone arm; and said reed switch being disposed at an end position of the sound reproduction of said recorded disc, 2. The apparatus as defined in claim 1 comprising a printed base board disposed above said recorded disc and carring substantially all of the electric circuit means, said reed switch being disposed at said end position through said printed board.

3. The apparatus as defined in claim 2 wherein said fixed contacts are provided on said printed board and said rotary contact is provided at a portion of the upper surface of said recorded disc such that said rotary contact engages said fixed contacts.

4. The apparatus as defined in claim 3 wherein said rotary contact engages said fixed contacts and a slip ring provided on said printed board.

5. The apparatus as defined in claim 1, 2, 3 or 4 further including a pickup producing an electric output signal,
amplifier means for amplifying said electric output signal of said pickup,
a fourth pickup inhibit transistor, a base of said fourth transistor being connected to the connection of said electromagnetic actuator means and said actuator transistor circuit means a collector of said fourth transistor being connected to the connection of said pickup and said amplifier means, and a second capacitor connected across the base-emitter circuit of said fourth transistor.

* * * * *